(12) United States Patent
Beitman, Sr.

(10) Patent No.: US 8,452,171 B1
(45) Date of Patent: May 28, 2013

(54) TELEPHOTO LENS SIGHTING APPARATUS

(76) Inventor: Richard Clark Howell Beitman, Sr., Gilbert, AZ (US)

( * ) Notice: Subject to any disclaimer, the term of this patent is extended or adjusted under 35 U.S.C. 154(b) by 94 days.

(21) Appl. No.: 13/214,031

(22) Filed: Aug. 19, 2011

(51) Int. Cl.
*G03B 13/02* (2006.01)

(52) U.S. Cl.
USPC ............................................. 396/375

(58) Field of Classification Search
USPC ...... 396/373, 375, 378, 379; 33/366; 348/341
See application file for complete search history.

(56) References Cited

U.S. PATENT DOCUMENTS

| | | | | |
|---|---|---|---|---|
| 2,699,608 A * | 1/1955 | Yocum | | 33/266 |
| 4,216,589 A * | 8/1980 | Beaver | | 33/266 |
| 4,283,860 A * | 8/1981 | Rucker | | 33/277 |
| 4,893,141 A * | 1/1990 | Smart | | 396/375 |
| 5,025,565 A * | 6/1991 | Stenerson et al. | | 33/265 |
| 5,437,104 A * | 8/1995 | Chien | | 33/266 |
| 6,431,768 B1 * | 8/2002 | Nakamura | | 396/348 |
| 8,213,788 B2 * | 7/2012 | Soll et al. | | 396/373 |

* cited by examiner

*Primary Examiner* — WB Perkey
(74) *Attorney, Agent, or Firm* — Adam R. Stephenson, Ltd.

(57) ABSTRACT

A telephoto lens sighting apparatus. A mount couples to a hot shoe of a camera and a first sight couples to the mount. The first sight has a first gap that corresponds with a viewing aperture of a telephoto lens coupled to the camera. A second sight may be movably coupled to the camera through a sliding track and may thereby move with respect to the first sight. The second sight has a second gap, and the first gap and second gap when aligned correspond with a viewing aperture of a telephoto lens coupled to the camera. A first receiver may couple to the camera to selectively receive the first sight and a second receiver may couple to the camera to selectively receive the second sight. The first sight and second sight may each pivot to a plurality of positions and their heights may be adjusted.

20 Claims, 9 Drawing Sheets

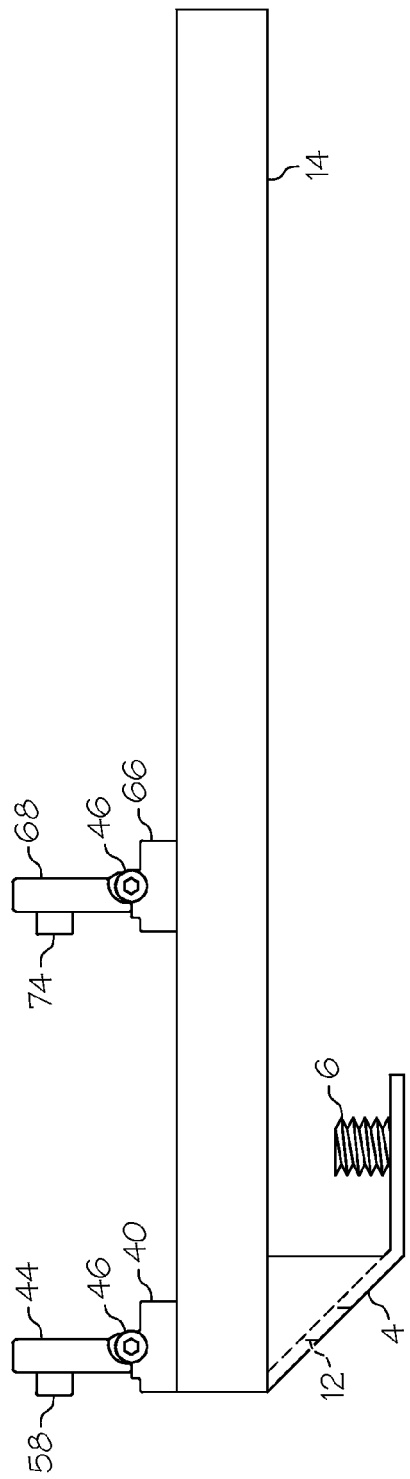
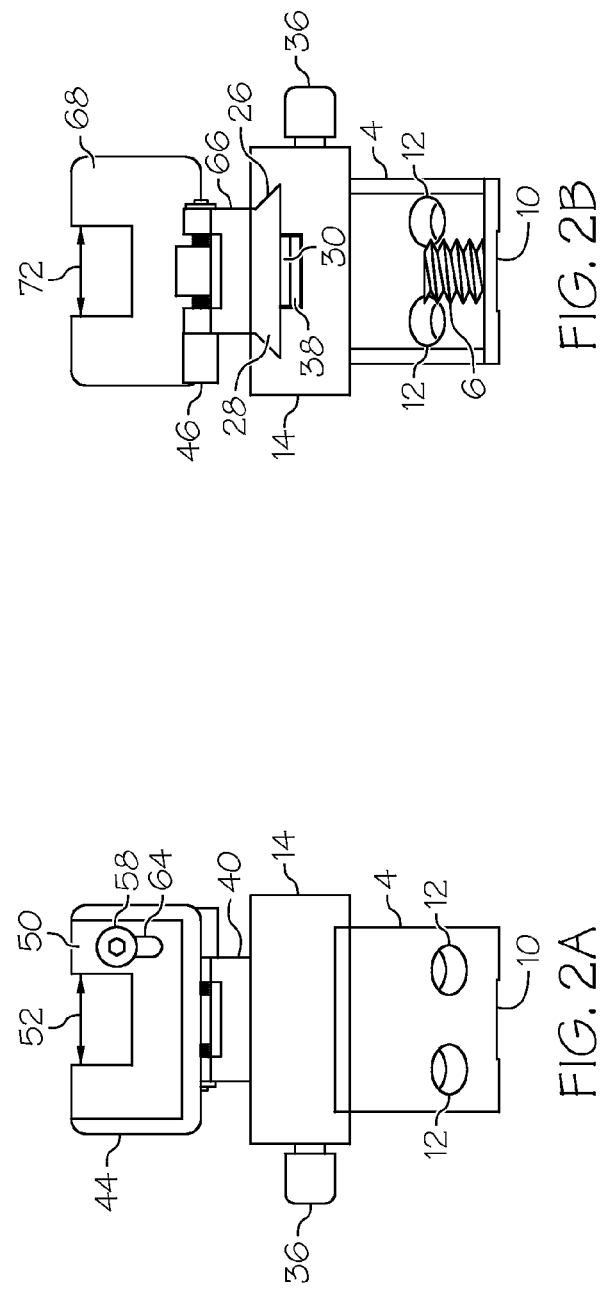

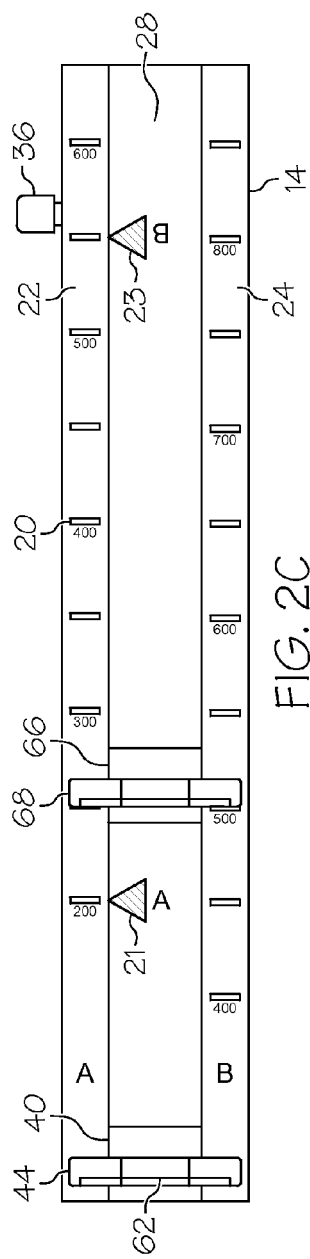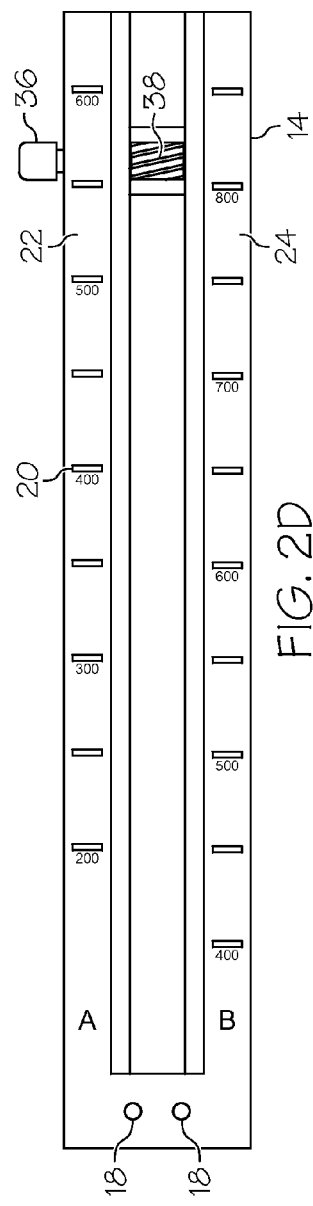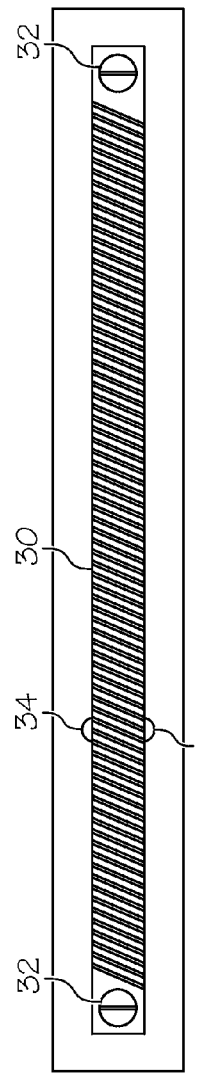

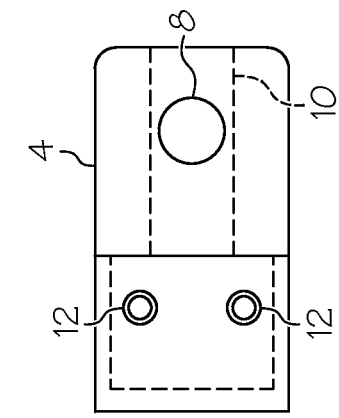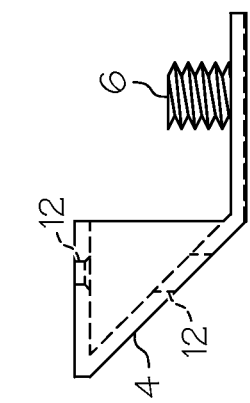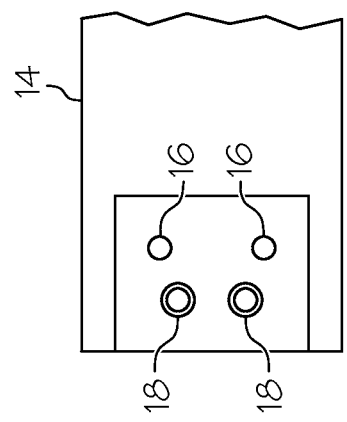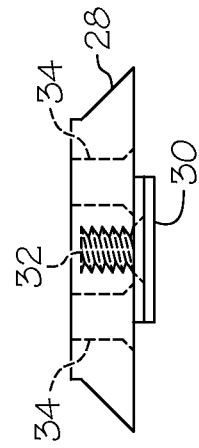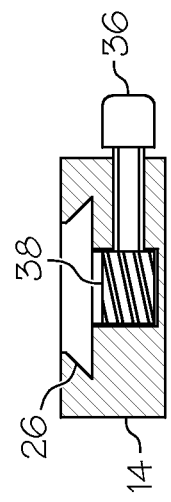
FIG. 3A
FIG. 3B
FIG. 3C
FIG. 3D
FIG. 3E

TELEPHOTO LENS SIGHTING APPARATUS

BACKGROUND

1. Technical Field

Aspects of this document relate generally to sighting systems and structures.

2. Background Art

Sighting systems and structures are used in various fields. Sighting systems and structures generally have an aperture or gap through which a user looks to view some targeted item and align some object in the direction of the targeted item.

SUMMARY

Implementations of a telephoto lens sighting apparatus may include: a mount configured to couple to a hot shoe of a camera; and a first sight coupled to the mount, wherein the first sight has a first gap configured to correspond with a viewing aperture of a telephoto lens coupled to the camera.

Implementations of a telephoto lens sighting apparatus may include one, all, or any of the following:

The first sight may be pivotably coupled to the mount and may be configured to pivot between a plurality of positions.

The mount may be configured to not be in electrical communication with the hot shoe when the mount is coupled to the hot shoe.

A height of the first sight may be adjustable.

The first sight may have a first opening through which a first coupler couples the first sight to a first receiver, and whereby the first receiver is coupled to the mount.

A biasing element may be configured to fixedly bias the first sight.

The first gap may include an upper gap having a first width along a first direction and a lower gap having a second width along the first direction, the first width being one of larger than, smaller than, and the same as the second width.

Implementations of a telephoto lens sighting apparatus may include: a first sight configured to couple to a camera, the first sight having a first gap; and a second sight configured to movably couple to the camera and thereby move with respect to the first sight, the second sight having a second gap; wherein the first gap and second gap when aligned with one another are configured to correspond with a viewing aperture of a telephoto lens coupled to the camera.

Implementations of a telephoto lens sighting apparatus may include one, all, or any of the following:

The first sight may be coupled to the camera through a first support and the second sight may be coupled to the camera through a second support movably coupled to the first support.

One of the first sight and second sight may be pivotably coupled to the camera and configured to pivot between a plurality of positions.

One of the first sight and second sight may have an adjustable height.

A biasing element may be configured to fixedly bias one of the first sight and second sight.

One of the first gap and second gap may include an upper gap having a first width along a first direction and a lower gap having a second width along the first direction, the first width being one of larger than, smaller than, and the same as the second width.

The second support may be movably coupled to the first support through a track, and movement of the second support along the track may enable the second sight to slide towards and away from the first sight.

Implementations of a telephoto lens sighting apparatus may include: a first receiver configured to couple to a camera, the first receiver configured to selectively receive a first sight; and a second receiver configured to movably couple to the camera and thereby move with respect to the first receiver, the second receiver configured to selectively receive a second sight; wherein the first sight and second sight, when aligned with one another, are configured to correspond with a viewing aperture of a telephoto lens coupled to the camera.

Implementations of a telephoto lens sighting apparatus may include one, all, or any of the following:

A first support may be coupled to one of the first receiver and second receiver and separately coupled to the camera, the first support having at least one indicator corresponding with a measured distance from the first sight to the second sight, the measured distance corresponding with a length of the telephoto lens.

The first receiver may be coupled to the camera through a first support and the second receiver may be coupled to the camera through a second support slidably coupled to the first support through a track.

One of the first receiver and second receiver may be pivotably coupled to the camera and may be configured to pivot between a plurality of positions.

One of the first receiver and second receiver may be configured to receive one of a first sight and a second sight at a plurality of positions to adjust a height of the one of the first sight and second sight.

The second receiver may be slidably coupled to the camera through a track and thereby slidable towards and away from the first receiver.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with e appended drawings, where like designations denote like elements, and:

FIG. 1B is a side view of an implementation of a telephoto lens sighting apparatus;

FIG. 2A is a front view of an implementation of a telephoto lens sighting apparatus;

FIG. 2B is a rear view of an implementation of a telephoto lens sighting apparatus;

FIG. 2C is a top view of an implementation of a telephoto lens sighting apparatus;

FIG. 2D is a top view of an implementation of a first support of a telephoto lens sighting apparatus and related components;

FIG. 2E is a bottom view of an implementation of a second support of a telephoto lens sighting apparatus and related components;

FIG. 3A is a bottom view of an end of an implementation of a first support of a telephoto lens sighting apparatus;

FIG. 3B is a side see-through view of an implementation of a mount of a telephoto lens sighting apparatus and related components;

FIG. 3C is a top view of an implementation of a mount of a telephoto lens sighting apparatus;

FIG. 3D is a front see-through view of an implementation of a first support of a telephoto lens sighting apparatus and related components;

FIG. 3E is a front see-through view of an implementation of a second support of a telephoto lens sighting apparatus and related components;

DESCRIPTION

This disclosure, its aspects and implementations, are not limited to the specific components or assembly procedures disclosed herein. Many additional components and assembly procedures known in the art consistent with the intended telephoto lens sighting apparatuses and/or assembly procedures for telephoto lens sighting apparatuses will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such telephoto lens sighting apparatuses and implementing components, consistent with the intended operation.

Figure 1A:
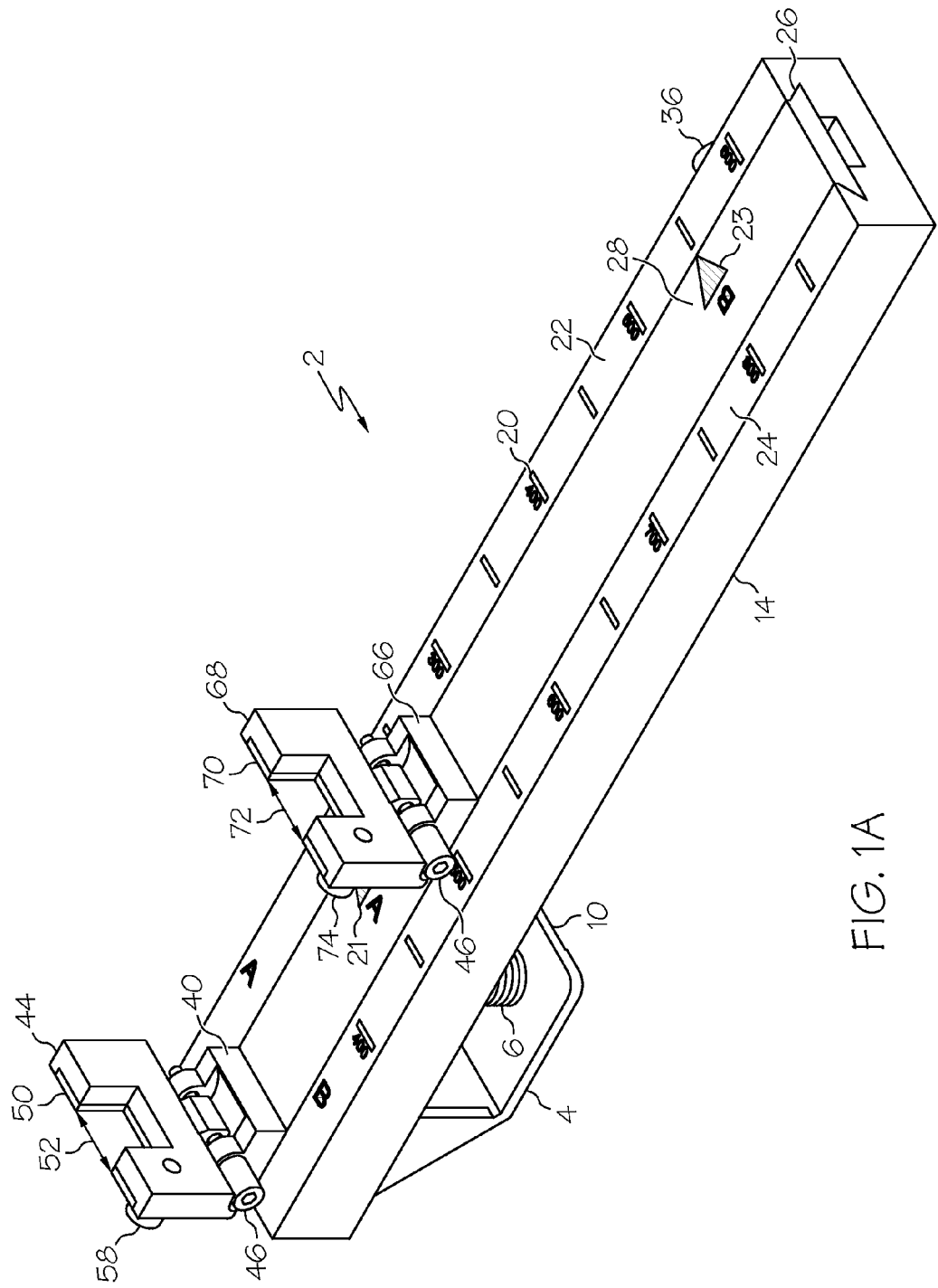
FIG. 1A is a perspective view of an implementation of a telephoto lens sighting apparatus.

Referring now to FIG. 1A, in various implementations a sighting apparatus (telephoto lens sighting apparatus) 2 includes a mount 4 which is configured to couple to the hot shoe of a camera. A hot shoe is a mounting point on the top of camera configured to receive and power a flash unit and/or other electrical accessories. Different camera manufacturers have differently sized and shaped hot shoes, for instance CANON® cameras may have one type of hot shoe, SONY® cameras may have a different type of hot shoe, MINOLTA® cameras may have a different type of hot shoe, and so forth. The mount 4 may therefore have various shapes and configurations to allow it to couple to the various types of hot shoes that exist on various brands and models of cameras.

The mount 4, if made of an electrically conducting material, is designed to not be in electrical contact with the hot shoe in order to prevent shorting of the camera power source. In the implementation of FIG. 1A this is accomplished by a recess 10 in the bottom of the mount 4 (also seen in FIGS. 2A-2B) which is configured to keep the mount 4 from touching one or more of the electrically active components of the hot shoe. Other mechanisms could be used to ensure that the mount 4 is not in electrical contact with the hot shoe, such as an electrically insulating component between the mount 4 and the hot shoe. In still other implementations the mount 4 could be configured to be in electrical communication with the hot shoe so as to power one or more components of the telephoto lens sighting apparatus 2. A mount screw 6 secures the mount 4 to the hot shoe.

A first support 14 is coupled to the mount 4. For the exemplary purposes of this disclosure, the first support 14 may have a length of about 134 mm. A first sight 50 is coupled to the first support 14. The first sight 50 has a first gap 52. The first gap 52 may have a size and be at a distance from the user's eye so as to allow the user to align the user's eye, the first gap 52, and an object to be photographed such that this alignment would alert the user that the object to be photographed is within the field of view of a telephoto lens coupled to the camera, thus allowing a photo shot to be snapped. This may allow the user to take a photo of the object and ensure it is within the field of view of the telephoto lens without needing to locate the object to be photographed through the photo-capturing aperture of the camera itself through the telephoto lens or through another sighting element that is integral to the camera itself but which contains a fixed view area that does not change in accordance with changes of camera lenses. In particular implementations, the first sight 50 and first gap 52 alone are configured to correspond with the viewing aperture of one or more telephoto lenses.

Referring still to FIGS. 1A and 2A, in implementations the first sight 50 is selectively received by a first receiver 44. A first coupler 58 secures the first sight 50 to the first receiver 44 through a first opening 64 in the first sight 50. The first opening 64 in this implementation has a slot-like shape that allows the height of the first sight 50 to be adjusted with respect to the first receiver 44. The first coupler 58 in this implementation is a socket head screw configured to receive a hex key (Allen wrench) and may be loosened to allow the first sight 50 to be adjusted up and down and then tightened to lock the first sight 50 at the desired height. The first receiver 44 is coupled to a first base 40 with a pivot 46, thus allowing the first receiver 44, and therefore the first sight 50, to be pivotable to a plurality of positions via the pivot 46. In other implementations the first sight 50 and/or first receiver 44 could be non-rotatably or fixedly coupled or integral with the first support 14 and/or with the mount 4 and/with to the camera.

Referring to FIG. 1A, the first support 14 in the implementation shown has the shape of a rectangular cuboid with a slot 26 for the reception of a second support 28. In the implementation shown the first support 14 has sharp edges and corners but in other implementations the first support 14 could be rounded at the edges and/or the corners. In various implementations, a second base 66 may be secured to the second support 28 and a second receiver 68 pivotally coupled to the second base 66 with a pivot 46. The second receiver 68 receives a second sight 70 in like manner as the first receiver 44, using a second coupler 74 to fix it thereto through a second opening in the second sight 70. The second sight 70 has a second gap 72. As can be seen in the drawings, in particular implementations, one or more of the second base 66, second receiver 68, second sight 70, second gap 72 and second coupler 74 may be similar to or identical with the corresponding first base 40, first receiver 44, first sight 50, first gap 52 and first coupler 58, respectively. In implementations the aforementioned "second" elements will all be similar or identical to the aforementioned "first" elements except that the first sight 50 and second sight 70 will be different in size and/or shape and/or the first gap 52 and second gap 72 will be different in size and/or shape. Thus, for instance, in implementations a height of the second sight 70 may be adjusted with respect to the second receiver 68, the second sight 70 (as well as the second receiver 68 and first receiver 44) is pivotable to a plurality of positions through a pivot 46, and so on.

Referring still to FIG. 1A, the first support 14 has indicators 20 on a first side 22 and second side 24 of a top face of the first support 14. Each indicator 20 indicates a specified distance from some element, such as the first sight 50, to the indicator 20, which corresponds with a measured distance between the first sight 50 and second sight 70. The indicator 20 thus allows the user to visually assess where to position the second sight 70 with respect to the first sight 50 by lining up the second sight 70, second receiver 68, second base 66, second support 28, or some marking on any one of these elements, with a specific indicator 20. As illustrated in FIG. 1A, a focal length arrow 21 consisting of a diamond with the letter A adjacent to it may be used in indicate the proper positioning of the second sight 70 at an indicator 20 of the plurality of indicators along the side of the first support 14 that has the letter A on it. When different sized telephoto lenses are used with the camera, for instance, the second sight 70 may need to be separated a different distance from the first sight 50 in order for the sighting apparatus 2 to work properly. The second sight 70 may be moved with respect to the first sight 50 by sliding the second support 28 in the slot 26 of the first support 14 using an advancer 36. The advancer 36 when rotated in one direction will distance the second sight 70 from the first sight 50 and when rotated in the other direction will draw the second sight 70 nearer to the first sight 50.

For certain telephoto lenses, in order to set the second sight 70 at the proper distance from the first sight 50, the set of indicators 20 on the side of the first support 14 that has the letter B on it may need to be used. In order to align the second support 28 with these indicators 20 in this situation, the user physically removes the second support 28 from the first support 14, rotates the second support 28 180 degrees, and reinserts the second support 28 into the second support 14. By an doing, the focal length arrow 23 consisting of a diamond with the letter B will be pointing to the side of the first support 14 that has the letter B on it. Now the user can use the advancer 36 to adjust the position of the second support 28 to align the focal length arrow 23 with the appropriate indicator 20 of the plurality of indicators 20 that correspond with the B side. In this way, the sighting apparatus 2 may be used bidirectionally.

The use of the first sight 50 and second sight 70 for taking a photo with the camera is similar to that described above with respect to the first sight 50 alone, except that when both the first sight 50 and second sight 70 are present, the user visually aligns the first gap 52, the second gap 72, and the object to be photographed before taking the picture. Because of the distance between the second sight 70 and the first sight 50 and the size of the first gap 52 and second gap 72, an objected viewable within both gaps is also in the viewing window of the telephoto lens. In this way the first gap 52 and second gap 72 (and thus the first sight 50 and second sight 70) when aligned are configured to correspond with the viewing aperture of a telephoto lens. To show that some versions may also function without the need of a second sight 70, user could also, by non-limiting example, employ a long first sight 50, i.e., a first sight 50 that is located where the second sight 70 would be placed, which has a first gap 52 that is either constant along this distance or varied (smoothly or stepwise) so that at its far end (i.e., near where the second sight 70 would be if present) the first gap 52 has a width that the second gap 72 would have if the second sight 70 were present. Thus what would be the second gap 72 if the second sight 70 were present would, in this implementation, be the same as the size of the first gap 52 of the first sight 50, so that a second sight 70 would not be used. In such implementations, however, that employ just one sight, the ability of the user to fully align the telephoto lens in the vertical direction with a vector extending straight from the user to the object being photographed may be hampered, because the single sight does not allow the user to be able to visually see the amount of vertical deviation the telephoto lens is experiencing from the straight vector line to the object.

Referring still to FIG. 1A, different dimensions of the various components allow for the telephoto lens sighting apparatus 2 to be used in conjunction with many different sized telephoto lenses. For instance, and by non-limiting example, in various implementations, the following dimensions may be varied: the size and shape of each of the first sight 50 and second sight 70; the various first sights 50 and second sights 70 in the first receiver 44 and second receiver 68, respectively, may be interchanged; and the height of each with respect to the first receiver 44 and second receiver 68, respectively, may be varied to correspond to a specific configuration (magnification, length, size, etc.) of a particular telephoto lens. Likewise, the slidability of the second support 28 in the slot 26 of the first support 14 allows the distance between the first sight 50 and second sight 70 to be adjusted to correspond to a specific set of telephoto lens characteristics. The indicators 20 assist in the adjustment of the second sight 70 to a predetermined specific distance from the first sight 50 to correspond with a specific telephoto lens configuration. Additionally, a different set of indicators 20 may placed along the first side 22 than is placed on the second side 24, so that for instance the indicators 20 on the first side 22 are configured to corresponds with one set of telephoto lenses and the indicators 20 on the second side 24 are configured to correspond with another set of telephoto lenses. In particular implementations, each of the indicators 20 when used with specific combinations of the first gap 52 and/or second gap 72 on either or both sides may correspond with the characteristics of yet another set of telephoto lenses. Thus an "A" may be seen at one end of the first side 22 and a "B" on the second side 24, indicating that the indicators 20 correspond with two different sets of telephoto lenses. In particular implementations, and as illustrated in FIG. 1A, the indicators 20 may be accompanied with a numerical value (i.e. 300) which corresponds with the length in millimeters of the telephoto lens (300 mm) attached to the camera. In other particular implementations, depending upon whether a particular size is chosen for the first gap 52 and/or second gap 72, the values adjacent to the indicators 20 may be multiplied by a predetermined factor (i.e., by about 1.5X or about 2X).

Referring now to FIG. 1B, which is a side view of an implementation of a telephoto lens sighting apparatus 2, a first support 14 is seen coupled to amount 4, the mount 4 having a mount screw 6 to couple to a hot shoe of a camera. The mount 4 has a first support access hole 12 by which a user may gain access to the first support 14, for instance to couple the mount 4 to the first support 14 with a screw or other coupling member. The first base 40, which is coupled to the first support 14, is seen coupled to a first receiver 44 with a pivot 46, and the first coupler 58 is visible. The second base 66 is also seen coupled to the second receiver 68 with a pivot 46, and the second coupler 74 is visible.

Referring now to FIG. 2A, which is a front view of an implementation of a telephoto lens sighting apparatus 2, the mount 4 is seen with the recess 10 at its bottom. Two first support access holes 12 can be seen. The mount 4 is coupled to a first support 14 and the advancer 36 is visible. The first base 40 is coupled to the first support 14 and to a first receiver 44, and a first sight 50 having a first gap 52 is coupled to the first receiver 44 with a first coupler 58 which passes through a first opening 64 in the first sight 50. The slotted nature of the first opening 64 allows the first sight 50 to be selectively moved with respect to the first receiver 44, after loosening or removing the first coupler 58, and subsequently locked into place at the desired position by tightening the first coupler 58 against the first sight 50, as previously described.

Referring now to FIG. 2B, which is a rear view of an implementation of a telephoto lens sighting apparatus 2, the mount 4 is again visible with the recess 10. The first support access holes 12 are again visible, and the mount screw 6 is seen. The first support 14 is seen coupled to the mount 4 and the second support 28 is seen slidably coupled to a slot 26 in the first support 14. The second support 28 has a track 30 which engages with a face 38 of the advancer 36, and by this engagement the advancer 36 may be rotated in one direction to move the second sight 70 away from the first sight 50 and rotated in an opposite direction to move the second sight 70 towards the first sight 50. In various implementations, the face 38 of the advance 36 may include a plurality of gear teeth angled with respect to the second support, each configured to engage with a corresponding slot in the track 30. In various implementations a set screw may be coupled to the first support 14 and may be configured to selectively engage the second support 28, in order to prevent undesired sliding of the second support 28 with respect to the first support 14, when the second support 28 is at a desired position. The second base 66 is seen coupled to the second support 28 and to the second receiver 68 through a pivot 46. The second gap 72 of the second sight 70 in this instance is the same width as a corresponding gap in the second receiver 68, though in implementations the second gap 72 may have different gap dimensions than the corresponding gap(s) in the second receiver 68. Likewise, in implementations the first gap 52 of the first sight 50 is the same width as the corresponding gap(s) in the first receiver 44, though in implementations the first gap 52 may have a different width than the corresponding gap(s) in the first receiver 44.

Figure 4A:
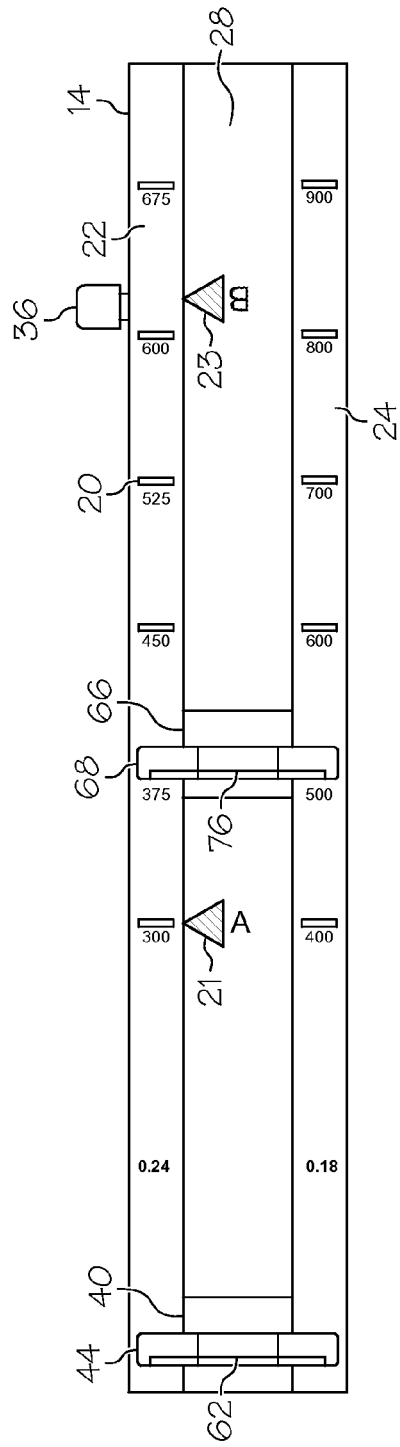
FIG. 4A is a top view of an implementation of a telephoto lens sighting apparatus.

Referring now to FIGS. 2C and 4A, a first support 14 is seen with a second support 28 coupled thereto. The first support 14 has indicators 20 on a first side 22 and second side 24 of a top face of the first support 14. The advancer 36 is again visible as are the first base 40 and first receiver 44. In this figure, the first sight 50 and first coupler 58 are not installed, and a first receiver recess 62, which the first sight 50 sits in when coupled to the first receiver 44, is visible. Likewise, the second base 66 and second receiver 68 are visible and the second sight 70 and second coupler 74 are not installed, thus revealing a second receiver recess 76 in the second receiver 68 which the second sight 70 sits in when coupled to the second receiver 68.

FIG. 2D is a view similar to FIG. 2C except that several additional elements have been removed, namely the second support 28, first base 40, first receiver 44, second base 66, second receiver 68, and related components. The first support 14 is still visible with the indicators 20 on a first side 22 and second side 24. The advancer 36 is seen and, with the second support 28 removed, the face 38 of the advancer 36 is visible. The face 38 has grooves or treads which engage with the track 30 of the second support 28 to move the second support 28 in one direction by rotating the advancer 36 in one direction or to more the second support 28 in an opposite direction by rotating the advancer 36 in an opposite direction. First base access holes 18 are visible at an end of the first support 14. The first base 40 is coupled to the first support 14 by screws which are inserted through the bottom of the first support 14 through the first base access holes 18 and screwed upwards into first base threads 42 (visible in FIG. 7A) of the first base 40.

Referring to FIGS. 2C and 2E, a bottom view of a second support 28 with a track 30 attached to it by track screws 32 is illustrated. The track 30 has grooves or treads which are visible which engage with the face 38 of the advancer 36 to allow the advancer 36 to move the second support 28 with respect to the first support 14. The second support 28 has two second base access holes 34 which are visible. The second base 66 is coupled to the second support 28 by screws which are inserted through the bottom of the second support 28 through the second base access holes 34 and screwed upwards into second base threads of the second base 66.

FIG. 3A is a bottom view of an end of an implementation of a first support 14. The first base access holes 18, which have been previously described, are visible. First support threads 16 are also visible. The mount 4 couples to the first support 14 using the first support threads 16. Referring now to FIG. 3B, which is a side see-through view of a mount 4, the first support access holes 12 are visible (along with the mount screw 6). The first support access holes 12 are also seen in FIG. 3C, which is a top view of the mount 4. The mount 4 is coupled to the first support 14 by placing screws upwards through the bottom of the mount 4, through the first support access holes 12, and screwing the screws into the first support threads 16. FIG. 3C also shows the screw hole 8 through which the mount screw 6 passes to couple the mount 4 to the camera hot shoe, and the recess 10 which prevents the mount 4 from being in electrical communication with the hot shoe. In various implementations, the shape and configuration of the mount 4 may obviate the need to use a mount screw 6. For instance, by non-limiting example, the mount 4 may securely fit to a hot shoe with a friction fit, a magnetic coupling, a slot in the camera around the hot shoe, or any other structure or method of coupling.

FIG. 3D is a front see-through view of an implementation of a first support 14 and related components. The slot 26 is visible, along with the advancer 36 and the face 38 of the advancer 36. The treads or grooves on the face 38 are visible. FIG. 3E is a front see-through view of an implementation of a second support 28 and related components. The track 30 is seen installed to the second support 28 with track screws 32. The second base access holes 34, previously described, are also shown.

FIG. 4A is a top view of an implementation of a telephoto lens sighting apparatus 2. Similar elements as are shown in previous drawings are shown here, namely the first support 14, indicators 20 on a first side 22 and second side 24 of the first support 14, second support 28, first base 40, first receiver 44, first receiver recess 62, second base 66, second receiver 68, second receiver recess 76, and advancer 36. The indicators 20 in this implementation have different numbers, for different measurements, than the indicators 20 of FIG. 2C, and the "A" and "B" are replaced with "0.24" and "0.18", respectively, which correspond with specific first sights 50 and/or second sights 70. A large black diamond shape is located on the top surface of the second support 28. In this implementation it is the diamond which would be lined up with the proper indicator 20 in order to ensure the desired distance between the first sight 50 and second sight 70 for a specific telephoto lens has been set.

Figure 4B:
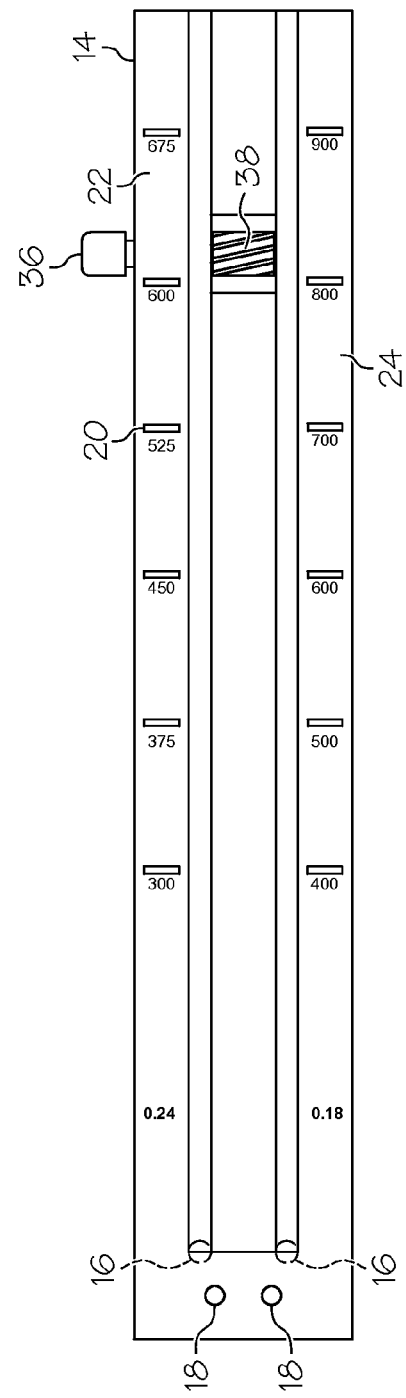
FIG. 4B is a top view of an implementation of a first support of a telephoto lens sighting apparatus and related components.

FIG. 4B is a view similar to 4A except that several additional elements have been removed, namely the second support 28, first base 40, first receiver 44, second base 66, second receiver 68, and related components. The first support 14 is seen along with the advancer 36 and its face 38, as well as the indicators 20 on a first side 22 and second side 24 of the first support 14. First base access holes 18 and first support threads 16, both of which have been previously described, are also visible.

In implementations the telephoto lens sighting apparatus 2 of FIG. 4A is shorter than the telephoto lens sighting apparatus 2 of FIG. 2C and is configured for focal lengths from 300 mm to 900 mm, while the sighting apparatus 2 of FIG. 2C is configured for focal lengths from 200 mm to 1200 mm.

The dimensions of the various gaps in the first sight 50 and the second sight 70 and the distance at which the second sight 70 is placed relative to the first sight 50 may be determined using the set of equations that determine the field of view (FOV) of a telephoto lens. By determining the aperture of the horizontal field of view at distances about an inch to about 6 inches from the camera sensor in consultation with the focal length of the telephoto lens and digital image array camera sensor characteristics, the physical width of the first gap 52 and second gap 72 can be calculated. The equations involved are the following:

Field of View Equations:

Diagonal angle of view in degrees: $\alpha_d = 2\tan^{-1}(d/2f)$ (1)

Horizontal angle of view in degrees: $\alpha_h = 2\tan^{-1}(h/2f)$ (2)

Vertical angle of view in degrees: $\alpha_v = 2\tan^{-1}(v/2f)$ (3)

Horizontal aperture: $\sin(\alpha_h)(l)$ (4)

Vertical aperture: $\sin(\alpha_v)(l)$ (5)

Where d is the camera sensor diameter, f is the lens focal length, h is the camera sensor length, v is the camera sensor height, and l is the length to the aperture.

These same equations are used to calculate both focusing aperture and focus point aperture. The following equations are utilized to make fine corrections to various lens characteristics:

Correction Equations:

Horizontal correction travel maximum: +/−1.25 mm, 2.5 mm total

Horizontal correction angle: $\alpha_{hc} = \sin^{-1}(c_{dh}/l)$ (6)

Horizontal correction angle maximum: $\alpha_{hc(max)}$ =2.82°~0.94° (4.92'~1.64'@100 ')

Elevation correction travel maximum: +/−3.5 mm

Elevation correction angle: $\alpha_{hc} = \sin^{-1}(c_{dv}/l)$ (7)

Elevation correction angle maximum: $\alpha_{vc(max)}$ =3.95°~1.32° (6.89'~2.30'@100')

Vertical longitudinal off axis correction: 4.0"

Longitudinal uncorrected axis intersection: 11'~20'

Where l is the length to the aperture, and c is a correction value in the form of a delta in the horizontal or vertical direction (hc or vc as indicated). This correction value may be translated initially into a set of turns to be applied to the hex screw operating pivot 46 in FIG. 7A but this correction may vary by a percentage for a given telephoto lens focal length setting.

The above equations were used to perform the calculations summarized in Table 1, forming a table of parameters in the form of an Angle and Aperture Chart for a 3:2 film/sensor format. A table of parameters for other camera sensors is included as Table 2.

TABLE 1

| Focal Length (mm) | Angle D of View (Deg) | Angle H of View (Deg) | Angle V of View (Deg) | Horizontal FOV Aperture @ | | | | | | | | | |
|---|---|---|---|---|---|---|---|---|---|---|---|---|---|
| | | | | 1" | 1.5" | 2" | 2.25" | 2.5" | 3" | 3.75" | 4" | 4.5" | 5" | 6" |
| 200 | 12.4 | 10.3 | 6.87 | 0.18" | | 0.36" | | | | | | | | |
| 300 | 8.25 | 6.87 | 4.58 | | 0.18" | 0.24" | | | 0.36" | | | | | |
| 400 | 6.19 | 5.15 | 3.44 | | | 0.18" | | | 0.24" | | 0.36" | | | |
| 450 | 5.51 | 4.58 | 3.06 | | | | | 0.18" | 0.24" | | 0.36" | | | |
| 500 | 4.96 | 4.12 | 2.75 | | | | | | 0.18" | | | | 0.36" | |
| 600 | 4.13 | 3.44 | 2.29 | | | | | | 0.18" | | 0.24" | | | 0.36" |
| 750 | 3.31 | 2.75 | 1.83 | | | | | | | 0.18" | | | 0.24" | |
| 800 | 3.10 | 2.58 | 1.72 | | | | | | | | 0.18" | | | |
| 900 | 2.76 | 2.29 | 1.53 | | | | | | | | | 0.18" | | 0.24" |
| 1000 | 2.48 | 2.06 | 1.38 | | | | | | | | | | 0.18" | |
| 1200 | 2.07 | 1.72 | 1.15 | | | | | | | | | | | 0.18" |
| Aperture landscape adjustment | | | | | 5.68° | | 2.82° | | | 1.88° | | 1.41° | | 1.13° | 0.94° |
| Aperture elevation adjustment | | | | | 7.92° | | 3.95° | | | | 2.63° | | 1.97° | | 1.58° | 1.32° |

| Focal Length (mm) | Angle D of View (Deg) | Angle H of View (Deg) | Angle V of View (Deg) | Aperture @ Subject distance | | | | | |
|---|---|---|---|---|---|---|---|---|---|
| | | | | Horiz 50' | Vert 50' | Horiz 100' | Vert 100' | Horiz 200' | Vert 200' |
| 200 | 12.4 | 10.3 | 6.87 | 9' | 6' | 18' | 12' | 36' | 24' |
| 300 | 8.25 | 6.87 | 4.58 | 6' | 4' | 12' | 8' | 24' | 16' |
| 400 | 6.19 | 5.15 | 3.44 | 4.5' | 3' | 9' | 6' | 18' | 12' |
| 450 | 5.51 | 4.58 | 3.06 | 4' | 2.7' | 8' | 5.3' | 16' | 10.7' |

TABLE 1-continued

| | | | | | | | | | |
|---|---|---|---|---|---|---|---|---|---|
| 500 | 4.96 | 4.12 | 2.75 | 3.6' | 2.4' | 7.2' | 4.8' | 14.4' | 9.6' |
| 600 | 4.13 | 3.44 | 2.29 | 3' | 2' | 6' | 4' | 12' | 8' |
| 750 | 3.31 | 2.75 | 1.83 | 2.4' | 1.6' | 4.8' | 3.2' | 9.6' | 6.4' |
| 800 | 3.10 | 2.58 | 1.72 | 2.25' | 1.5' | 4.5' | 3' | 9' | 6' |
| 900 | 2.76 | 2.29 | 1.53 | 2' | 1.3' | 4' | 2.7' | 8' | 5.3' |
| 1000 | 2.48 | 2.06 | 1.38 | 1.8' | 1.2' | 3.6' | 2.4' | 7.2' | 4.8' |
| 1200 | 2.07 | 1.72 | 1.15 | 1.5' | 1' | 3' | 2' | 6' | 4' |
| Aperture landscape adjustment | | | | 2.46'~0.82' | | 4.92'~1.64' | | 9.84'~3.28' | |
| Aperture elevation adjustment | | | | 3.44'~1.15' | | 6.89'~2.3' | | 13.8'~4.6' | |

TABLE 2

| Sensor Format | Sensor Size (mm) | Aspect Ratio | Lens Multiplier |
|---|---|---|---|
| Medium Format | 56.0 × 36.0 | 3:2 | 1.0 |
| | 53.9 × 40.4 | 4:3 | 1.0 |
| | 48.0 × 36.0 | 4:3 | 1.1 |
| | 33.1 × 44.2 | 4:3 | 1.3 |
| Full Frame | 36.0 × 24.0 | 3:2 | 1.0 |
| APS-H | 28.0 × 19.0 | 3:2 | 1.3 |
| APS-C | 23.5 × 15.6 | 3:2 | 1.5 |
| | 22.3 × 14.9 | 3:2 | 1.6 |
| 4/3 | 18.0 × 13.5 | 4:3 | 2.0 |

In Table 2, the equation for the sensor diagonal is as follows:

$$\text{Sensor Diagonal} = \sqrt{\text{sensorlength}^2 + \text{sensorwidth}^2} \qquad (8)$$

The Angle and Aperture chart shown in Table 1 contains the parameters that can be used with approximately 98% of the photographic systems presently in use, since most use a 3:2 sensor format. In the table, the three columns next to the column of lens focal lengths provide the viewing planes in the vertical, horizontal, and diagonal directions. Table 2 shows all the other potential sensor arrays with their aspect ratios and their lens multiplier for any given lens focal length with which they may be used. The lens multiplier times the focal length being used gives the true focal length and associated angles of view that the sensor can see. The value of this true focal length will be where the operator aligns the desired one of the focal length arrows 21, 23 on the second support 28 with a corresponding value on the given indicator 20 on the base 14.

There are several outputs available from Table 1 that allow for selection of the characteristics of the first sight 50, second sight 70, and the distance at which the first sight 50 and second sight 70 are separated. The table calculates the horizontal field of view (FOV) aperture at specific distances from the camera sensor, or the absolute aperture on the second sight 70 when positioned the indicated distance from the first sight 50. For example, for a 200 mm focal length lens, the absolute aperture at the first sight 50 when the second sight 70 is 1" from the camera sensor is 0.18". When the second sight 70 is 2" from the camera sensor, the absolute aperture at the first sight 50 is 0.36". The horizontal FOV aperture value also corresponds with the dimensions of the first gap 52 in FIG. 5A. By tracing the horizontal FOV aperture size back to a set of dimensions measurable along the length of the first support 14 of the telephoto lens sighting apparatus 2, the field of view or absolute aperture of the camera sensor when the 200 mm focal length telephoto lens is used can be represented by the dimensions of the space in the first gap 52. When the first gap 52 of the first sight 50 corresponding to a 0.18" value is aligned with a second gap 72 of the second sight 70 also corresponding to a 0.18" value (i.e., both sights have gaps with the same physical proportions), the user can be confident that if the object being photographed appears in the space in the gaps 52, 72, the object will be within the field of view of the telephoto lens and will be on the camera sensor at the time the shutter is opened. The table indicates that by selecting three standard horizontal FOV aperture values, 0.18", 0.24", and 0.36", focal lengths of from 200 mm to 1200 mm can be accommodated by using three different first and second gap sizes and gap configurations and by setting the distance between the first sight 50 and the second sight 70 at the value indicated on the table. In this way, the two sights may work together to ensure the image of the target is within the field of view of the camera sensor by the telephoto lens (and also simultaneously being tracked by the camera's lens autofocus sensor, if used) without requiring that the user check any onboard view finders to make sure. The field of view or absolute aperture as portrayed by a given aperture value can also be replicated at different positions and apertures which allows the overlap needed when aligning the desired one of the focal length arrows 21, 23 for the second sight 20 with the indicators 20 along the side of the support 14 that correspond with the A side and the B side, respectively.

The next area of Table 1 is labeled Aperture @ Subject Distance, which gives the actual field of view for a given focal point. These values may allow a user to be able to understand the compositional capabilities for a given photo subject while it is in the air or at a particular location while allowing the user to calculate the critical depth of field (i.e., near field and far field sharpness). The ability to calculate these critical depth of field values may allow the user to be both mechanically correct but also provide freedom for artistic license. Also in Table 1 is a set of aperture landscape (horizontal travel) adjustment values in degrees and feet and a set. of aperture elevation (vertical travel) adjustment values in degrees and feet. The values in degrees can be used to correct the position of the second sight 70 and shows the impact of those position corrections on the reflected focal point in feet. These adjustment values may be used by the operator to correct for any manufacturing inconsistencies in the position of the first sight 50 and the second sight 70. For example, these adjustment values may be employed to allow a user, while visually holding a target image in the camera viewfinder, to make corrections to the position of the first sight 50, the second sight 70, or both using these values to ensure that 100% of the target image is actually present in the viewfinder when 100% of the image is visible through the first sight 50 and the second sight 70. The way the position of the first sight 50 and the second sight 70 are adjusted will be described in the section discussing FIG. 7 below.

Figure 5A:
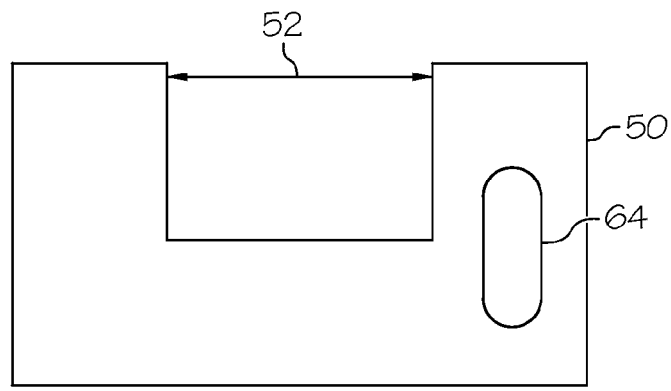
FIG. 5A is a front view of an implementation of a first sight of a telephoto lens sighting apparatus.

As was previously mentioned, FIG. 5A is a front view of an implementation of a first sight 50, which may be referred to as a 0.36 aperture sight (plate). The first gap 52 and first opening 64 are seen. The first gap 52 has a rectangular shape though in other implementations the first gap 52 could be circular, triangular, square, an irregular shape, a slit, or any other reentrant opening. Likewise in other implementations, the first opening 64 could have the shape of a circle, instead of rectangle with half-circle ends, or could have any other closed shape. The implementation in FIG. A may be referred to as a wide aperture plate, which can be used with telephoto lenses with comparatively wider apertures than others. For the exemplary purposes of this disclosure, the first gap 52 may be about 9.15 mm and the depth of the reentrant opening into the first sight 50 may be about 6.10 mm.

Figure 5B:
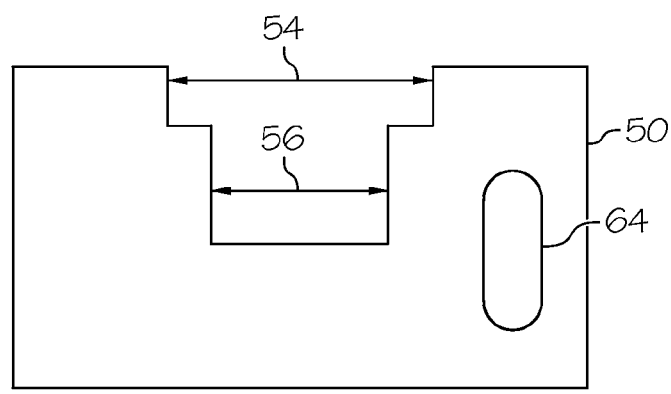
FIG. 5B is a front view of an implementation of a first sight of a telephoto lens sighting apparatus.

FIG. 5B is a front view of another implementation of a first sight 50, where the first gap 52 has an upper gap 54 and a lower gap 56, which may be referred to as a 0.24 aperture sight (plate). The upper gap 54 in this implementation has a greater width than the lower gap 56, though in other implementations the opposite could be true. As illustrated, the height of the upper gap 54 may be smaller than the height of the lower gap 56. The implementation of FIG. 5B may be referred to as a medium aperture plate. For the exemplary purposes of this disclosure, the upper gap 54 may be about 9.15 mm, the lower gap 56 may be about 6.10 mm, the total depth of the reentrant opening into the first sight 50 may be about 6.10 mm and the depth of the opening to the step formed by the lower gap 56 may be about 1.4 mm.

Figure 5C:
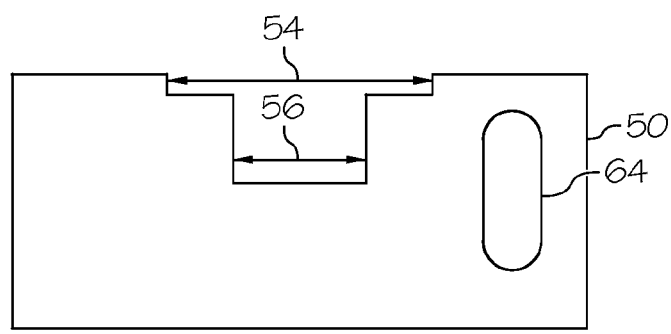
FIG. 5C is a front view of an implementation of a first sight of a telephoto lens sighting apparatus.

The implementation of FIG. 5C is similar to that of 5B except that the dimensions of the upper gap 54 and lower gap 56 are different, which may be referred to as a 0.18 aperture sight (plate). The height of the first gap 52 in the implementation of FIG. 5C (height of upper gap 54 plus height of tower gap 56) is less than the height of the first gap 52 of FIG. 5B. In addition, the height of the first sight 50 of the implementation of FIG. 5B is greater than the height of the first sight 50 of FIG. 5C (this can be seen by comparing the location of the first opening 64 with respect to the top of the first sight 50 of each drawing). Additionally, the height of the upper gap 54 and the height of the lower gap 56 of FIG. 5C are less than the height of the upper gap 54 and the height of the lower gap 56, respectively, of FIG. 5B. Moreover, the width of the lower gap 56 of FIG. 5C is smaller than the width of the lower gap 56 of FIG. 5B. The implementation of FIG. 5C may be referred to as a narrow aperture plate. For the exemplary purposes of this disclosure, the upper gap 54 may be about 9.15 mm, the lower gap 56 may be about 4.57 mm, the height of the lower gap 56 may be about 3.75 mm, and the height of the upper gap 54 may be about 0.80 mm.

Figure 8A:
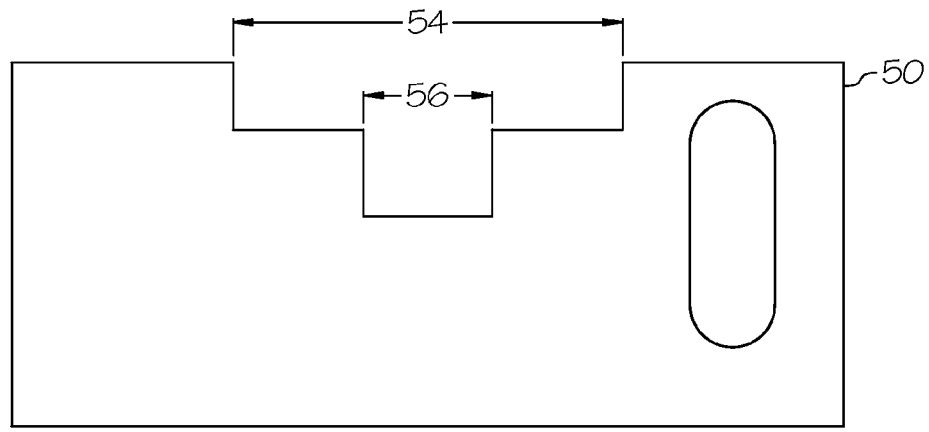
FIG. 8A is a front view of an implementation of a first sight of a telephoto lens sighting apparatus.

FIG. 8A is also similar to the implementations illustrated in FIGS. 5B and 5C except that the dimensions of the upper gap 54 and the lower gap 56 are different, and may be referred to as a 0.12 aperture sight (plate). The height of this implementation of a first sight 50 is the same as the height of the implementation illustrated in FIG. 5C. The principal differences between this implementation and the implementation in FIG. 5C is that the width of the second gap 56 is reduced and the height of the upper gap 54 is larger than the height of the upper gap 54 in FIG. 5C. The implantation of FIG. 8A may be referred to as an ultra-narrow aperture plate. For the exemplary purposes of this disclosure, the upper gap 54 may be about 9.15 mm, the lower gap 56 may be about 3.05 mm, the height of the lower gap may be about 2.03 mm, and the height of the upper gap may be about 1.72 mm.

These changes illustrate, by non-limiting example, how the various dimensions and aspects of the first sight 50, i.e.: shape, size, height, width, etc. of first sight 50; size, shape, location, height, width, etc. of first opening 64; size, shape, location, height, width, etc. of first gap 52; size, shape, location, height, width, etc. of upper gap 54; size, shape, location, height, width, etc. of lower gap 56; and so forth, may be altered in various implementations to create a configuration that corresponds to a particular telephoto lens focal length, sensor size, and so forth.

In addition, as seen in FIGS. 5B-5C, in implementations the upper gap 54 has a first width along a first direction, the first direction in the implementations shown being substantially parallel with the horizontal top edge of the first sight 50 (or second sight 70) and also substantially parallel with the horizontal bottom edge of the first sight 50 (or second sight 70). The lower gap 56 has a second width along the first direction and this width is one of smaller than, equal to, or greater than the first width of the upper gap 54 along the first direction.

The upper gap 54 and lower gap 56 could also each correspond to one set of indicators 20 on a first side 22 or second side 24 of the first support 14. For instance, referring to FIG. 2C, the upper gap(s) 54 could correspond to side "A" (the first side 22) and the lower gap(s) 56 could correspond to the side "B" (the second side 24), or vice versa. Thus if a user is sighting using the upper gap(s) 54 a first sight 50 and second sight 70 the indicators 20 on the "A" side would be used to measure the proper distance of the second sight 70 from the first sight 50, and if using the lower gaps 56 the "B" side would be used, or vice versa. The same may be said of the implementation of FIG. 4A, replacing "A" and "B" with "0.24" and "0.18," respectively. The "0.24" and "0.18", or A and B, may refer to whether the user is to use the upper gaps 54 or lower gaps 56 for the sighting, though in implementations they may also refer simply to which first sight 50 and/or second sight 70 is being used.

In implementations a user may use both the upper gaps 54 and lower gaps 56 for alignment of the camera to the proper position for a photograph. For instance, by non-limiting example, when the upper gap 54 of a first sight 50 has a different width than the lower gap 56 of a first sight 50 (and similarly for the second sight 70), then a horizontal ridge or edge is created where the upper gap 54 meets the lower gap 56. In implementations this horizontal ridge or edge could be used for vertical alignment, for instance by a user aligning the horizontal ridge or edge of the first sight 50 with the horizontal ridge or edge of the second sight 70 for vertical alignment of the camera, and aligning the vertical sides of the lower gap 56 of the first sight 50 with the vertical sides of the lower gap 56 of the second sight 70 for horizontal alignment of the camera.

In implementations the first sight 50 and/or second sight 70 could have a shape similar to a goalpost with the two upright sides of the goalpost movable to alter the width of the first gap 52 or second gap 72, respectively. In implementations there may be an additional element in the first gap 52 and/or second gap 72, such as, by non-limiting example, a circle, a semicircle, a triangle, a square, a rectangle, a crosshair, an "X", a line, a nipple, or some other element to help in the alignment of the first sight 50 and second sight 70. In implementations wherein the upper gap 54 and lower gap 56 have different widths this element may be at or near the horizontal ridge or edge created by the difference in widths of the upper gap 54 and lower gap 56.

Figure 6B:
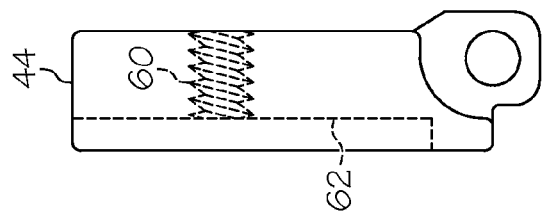
FIG. 6B is a side see-through view of an implementation of a first receiver of a telephoto lens sighting apparatus.
Figure 6D:
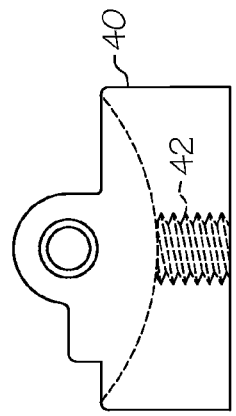
FIG. 6D is a side see-through view of an implementation of a first base of a telephoto lens sighting apparatus.
Figure 6A:
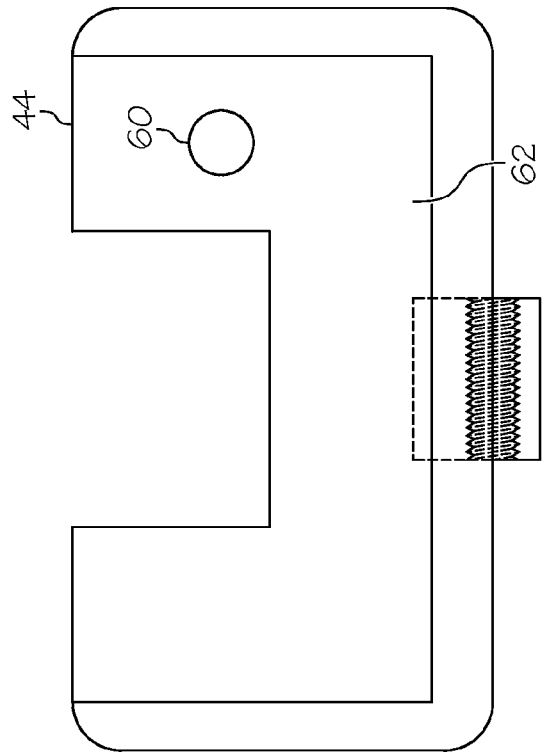
FIG. 6A is a front see-through view of an implementation of a first receiver of a telephoto lens sighting apparatus.
Figure 6C:
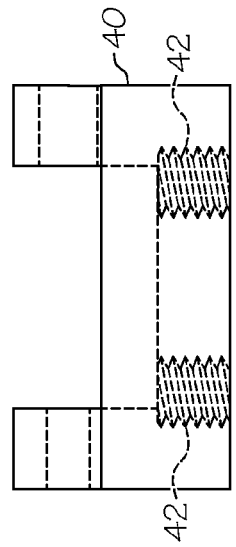
FIG. 6C is a front see-through view of an implementation of a first base of a telephoto lens sighting apparatus.

FIG. 6A is a front see-through view of an implementation of a first receiver 44. The previously described first receiver recess 62 is indicated, along with first receiver threads 60. The first coupler 58 couples the first sight 50 to the first receiver 44 by engaging the first receiver threads 60 through the first opening 64. FIG. 6B is a side see-through view of an implementation of a first receiver 44. The first receiver threads 60 and first receiver recess 62 are indicated. FIG. 6C is a front see-through view of an implementation of a first base 40 in which the first base threads 42 are indicated. FIG. 6D is a side see-through view of an implementation of a first base 40 in which the first base threads 42 are indicated. As can be envisioned from the fact that the first receiver 44 (and likewise the second receiver 68) has a gap similar to the first gap 52 of the first sight 50, in implementations the first receiver 44 itself may serve as a first sight 50, with its gap being the first gap 52, and the second receiver 68 itself may serve as a second sight 70, with its gap being the second gap 72.

Figure 7B:
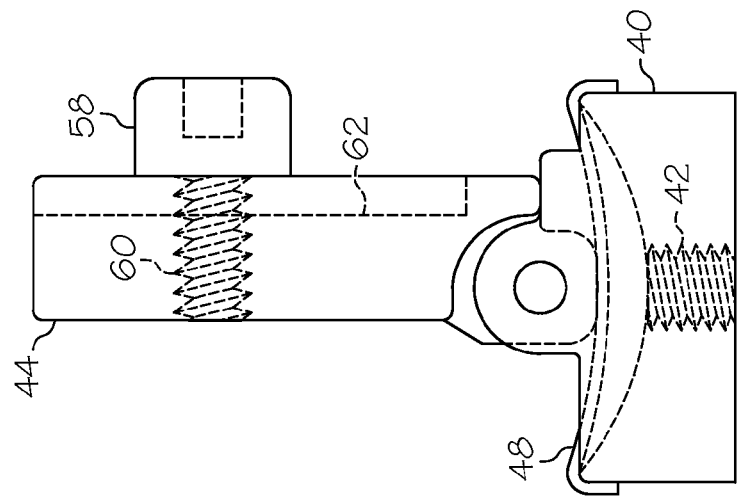
FIG. 7B is a side see-through view of an implementation of a first receiver and first base of a telephoto lens sighting apparatus and related components.
Figure 7A:
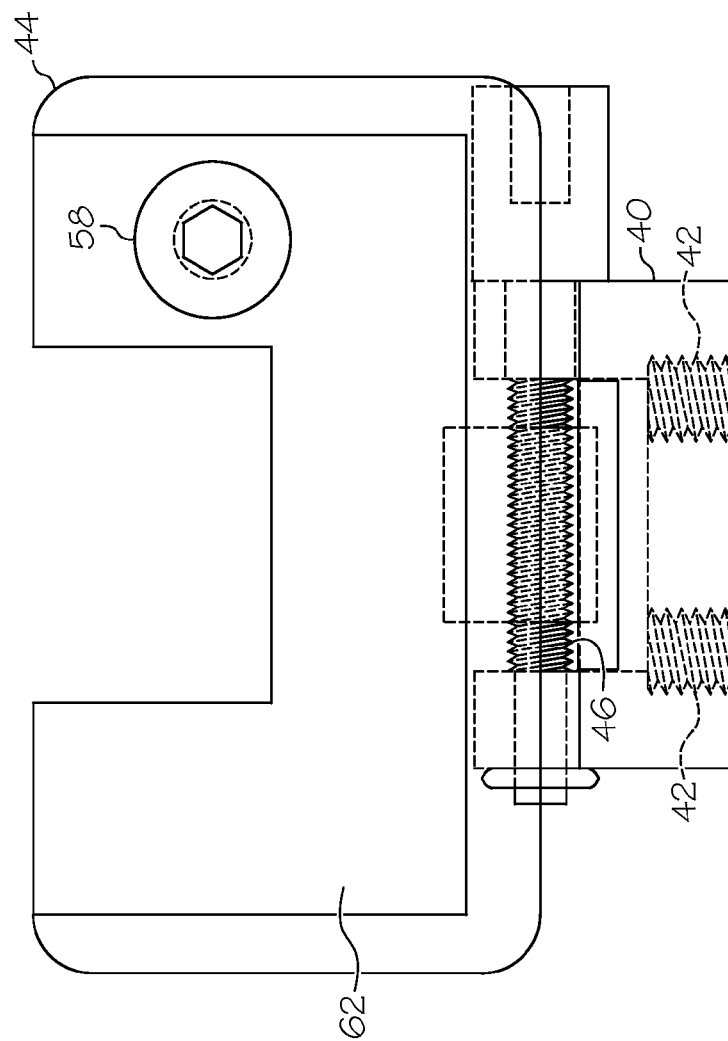
FIG. 7A is a front see-through view of an implementation of a first receiver and first base of a telephoto lens sighting apparatus and related components.

FIG. 7A is a front see-through view of an implementation of a first receiver 44 coupled to a first base 40 with a pivot 46. In various implementations, the hex screw included in pivot 46 may be used to adjust the rotational position of the first receiver 44 within the pivot as well as perform fine adjustments in the X (horizontal) axis as required to ensure the first receiver 44 and the second receive 68 are aligned to ensure that the entire object is within the field of view of the gaps in the first sight 50 and the second sight 70 as well as fully within the field of view of the camera sensor itself. These fine adjustments may be performed using the landscape adjustment values in Table 1. The first coupler 58 is installed and the first receiver recess 62 is visible along with the first base threads 42. FIG. 7B is a side see-through view of an implementation of a first receiver 44 coupled to a first base 40. The first base threads 42 and first receiver recess 62 are seen, and the first coupler 58 is screwed into the first receiver threads 60. A biasing element 48 is seen coupled to the first base 40 and engages a bottom of the first receiver 44. In the implementation shown the biasing element 48 is a steel spring. As can be seen from the shape and structure of the elements indicated in FIG. 7B (including the biasing element 48), the first receiver 44 of this implementation is biasable in two positions—one which is standing upright, i.e., the position shown in the drawing, and one which would be laying down with the back of the first receiver 44, i.e., the side opposite the side which receives the first sight 50, laid down flat and in implementations even touching the biasing element 48.

In implementations the second sight 70, second base 66 and second receiver 68 may have none, one, some, or all of the features, characteristics and sub-components as those described herein with respect to the first sight 50, first base 40 and first receiver 44, respectively. A biasing element 48 may be coupled to the second receiver 68 and to the second base 66 in like manner as that described above with respect to the first receiver 44 and first base 40. In particular, implementations, the biasing element 48 may also bias the first receiver 44 (and/or second receiver 68) in more than two positions.

While in this document implementations of telephoto lens sighting apparatuses 2 are coupled to the hot shoe of a camera, in others, they may be coupled to any other part of the camera, including the tripod mounting screw hole.

When using the sighting apparatus 2, a user selects a first sight 50 and second sight 70 according to the characteristics of the telephoto lens used, adjusts the height of each in the first receiver 44 and second receiver 68, respectively, and moves the second sight 70 to the desired position by moving the second support 28 with the advancer 36 to the proper location, using the indicators 20 on either a first side 22 or second side 24 of the first support 14 as guidance. The user may then as desired aim the camera at an object and take a photo after ensuring that the object is in view between both the first gap 52 and second gap 72.

Figure 8B:
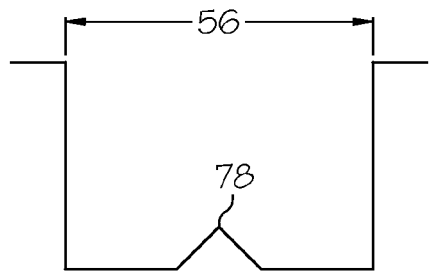
FIG. 8B is a front view of a first gap and indicator implementation of an implementation of a first sight of a telephoto lens sighting apparatus.
Figure 8C:
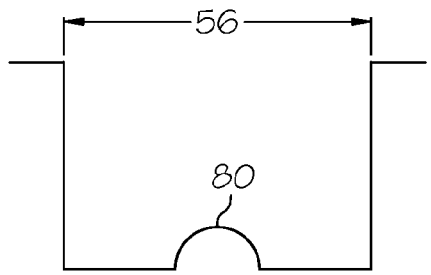
FIG. 8C is a front view of a first gap and indicator implementation of an implementation of a first sight of a telephoto lens sighting apparatus.
Figure 8D:
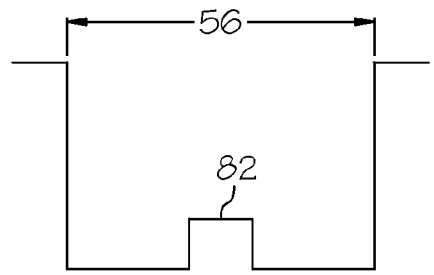
FIG. 8D is a front view of a first gap and indicator implementation of an implementation of a first sight of a telephoto lens sighting apparatus.

In various implementations of plates, sights, and receivers like those disclosed herein, a number of eye centering indicator implementations may be employed to aid the user in centering the sights on the subject to be photographed and in reducing eye strain. Referring to FIGS. 8B-8D, three different shaped eye centering indicator implementations 78, 80, and 82 are illustrated indicating the wide variety of different shapes that may be employed as indicators. A wide variety of different shapes could be used using the principles disclosed herein.

A wide variety of materials could be used to make the various elements described herein though in particular implementations some or all of the components are made of stainless steel. In other implementations some or all of the components are made of chrome plated brass. In implementations the various elements herein may be combined in a kit and transported in a padded case which holds most of the components, the padded case having an internal pouch which houses the various first sights 50 and second sights 70 and one or more tools wherewith to accomplish assembly and disassembly of the sighting apparatus 2. The padded case may also have a top which closes with VELCRO® hook and loop fasteners and a strap or other coupling element on its back which allows it to couple to a shoulder strap or other portion of a camera carrier worn by a user. The sighting apparatus 2 may be designed for micro adjustments in the positions of the first sight 50 and/or second sight 70 to account for alignment issues in the X (horizontal) axis or Y (vertical) axis caused by the manufacturing of the sighting apparatus 2 or mishandling.

In places where the description above refers to particular implementations of a telephoto lens sighting apparatus, it should be readily apparent that a number of modifications may be made without departing from the spirit thereof and that these implementations may be applied to other telephoto lens sighting apparatuses.

The invention claimed is:

1. A telephoto lens sighting apparatus, comprising:
   a mount configured to couple to a hot shoe of a camera; and
   a first sight coupled to the mount, wherein the first sight comprises a first gap configured to correspond with a viewing aperture of a telephoto lens coupled to the camera.

2. The device of claim 1, wherein the first sight is pivotably coupled to the mount and is configured to pivot between a plurality of positions.

3. The device of claim 1, wherein the mount is configured to not be in electrical communication with the hot shoe when the mount is coupled to the hot shoe.

4. The device of claim 1, wherein a height of the first sight is adjustable.

5. The device of claim 1, wherein the first sight comprises a first opening through which a first coupler couples the first sight to a first receiver, and whereby the first receiver is coupled to the mount.

6. The device of claim 1, further comprising a biasing element configured to fixedly bias the first sight.

7. The device of claim 1, wherein the first gap comprises an upper gap having a first width along a first direction and a lower gap having a second width along the first direction, the first width being one of larger than, smaller than, and the same as the second width.

8. A telephoto lens sighting apparatus, comprising:
   a first sight configured to couple to a camera, the first sight having a first gap; and
   a second sight configured to movably couple to the camera and thereby move with respect to the first sight, the second sight having a second gap;
   wherein the first gap and second gap when aligned with one another are configured to correspond with a viewing aperture of a telephoto lens coupled to the camera.

9. The device of claim 8, wherein the first sight is coupled to the camera through a first support and wherein the second sight is coupled to the camera through a second support movably coupled to the first support.

10. The device of claim 8, wherein one of the first sight and second sight is pivotably coupled to the camera and configured to pivot between a plurality of positions.

11. The device of claim 8, wherein one of the first sight and second sight has an adjustable height.

12. The device of claim 8, further comprising a biasing element configured to fixedly bias one of the first sight and second sight.

13. The device of claim 8, wherein one of the first gap and second gap comprises an upper gap having a first width along a first direction and a lower gap having a second width along the first direction, the first width being one of larger than, smaller than, and the same as the second width.

14. The device of claim 9, wherein the second support is movably coupled to the first support through a track, and wherein movement of the second support along the track enables the second sight to slide towards and away from the first sight.

15. A telephoto lens sighting apparatus, consisting essentially of:
a first receiver configured to couple to a camera, the first receiver configured to selectively receive a first sight; and
a second receiver configured to movably couple to the camera and thereby move with respect to the first receiver, the second receiver configured to selectively receive a second sight;
wherein the first sight and second sight, when aligned with one another, are configured to correspond with a viewing aperture of a telephoto lens coupled to the camera.

16. The device of claim 15, further comprising a first support coupled to one of the first receiver and second receiver and separately coupled to the camera, the first support comprising at least one indicator corresponding with a measured distance from the first sight to the second sight, the measured distance corresponding with a length of the telephoto lens.

17. The device of claim 15, wherein the first receiver is coupled to the camera through a first support and the second receiver is coupled to the camera through a second support slidably coupled to the first support through a track.

18. The device of claim 15, wherein one of the first receiver and second receiver is pivotably coupled to the camera and is configured to pivot between a plurality of positions.

19. The device of claim 15, wherein one of the first receiver and second receiver is configured to receive one of a first sight and a second sight at a plurality of positions to adjust a height of the one of the first sight and second sight.

20. The device of claim 15, wherein the second receiver is slidably coupled to the camera through a track and thereby slidable towards and away from the first receiver.

* * * * *